Aug. 12, 1941.  C. A. RAFFERTY  2,251,955
TEMPERATURE COMPENSATOR FOR PRESSURE ACTUATED INDICATORS
Filed June 25, 1940
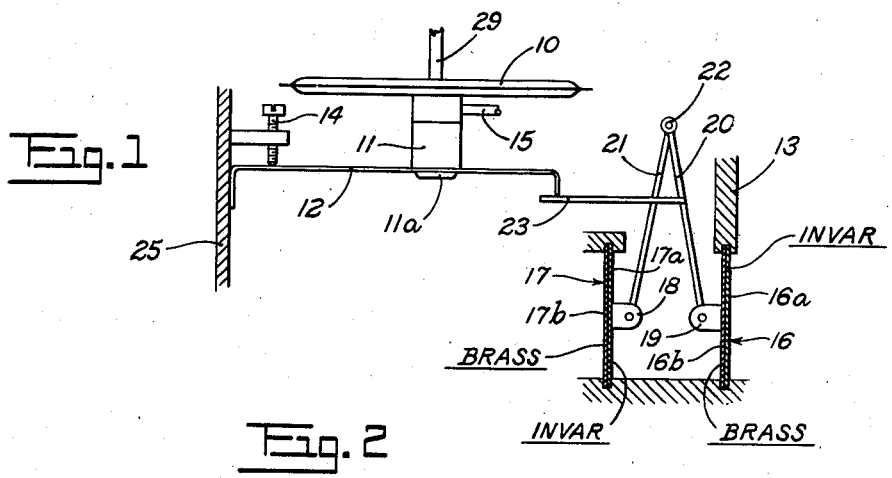
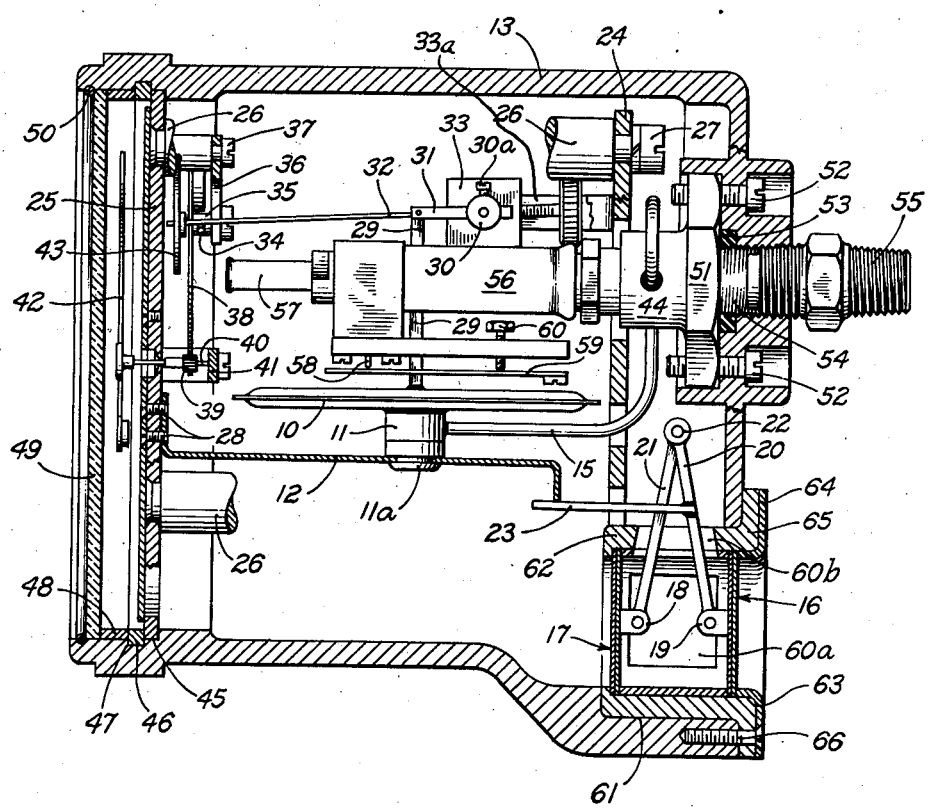
INVENTOR.
Christopher A. Rafferty
BY
Oerstvik & Kalman
ATTORNEY.

Patented Aug. 12, 1941

2,251,955

UNITED STATES PATENT OFFICE 2,251,955

TEMPERATURE COMPENSATOR FOR PRESSURE ACTUATED INDICATORS

Christopher Alois Rafferty, Brooklyn, N. Y., assignor to Bendix Aviation Corporation, Bendix, N. J., a corporation of Delaware Application June 25, 1940, Serial No. 342,360

14 Claims. (Cl. 73—179)

The present invention relates to pressure responsive indicating instruments and more particularly to instruments of the type wherein a differential between the pressures on two sides of a pressure responsive element, established by a change in one of said pressures, is utilized to operate an indicator or other means, and wherein means are provided for the equalization of said pressures when pressure change no longer takes place.

A rate of climb indicator, for example, constitutes such an instrument, and the invention is illustrated and described hereinafter in connection with such an instrument, but it will be understood, however, that it is not restricted to this particular use and may be embodied in aneroid altimeters, manifold pressure gauges, airspeed indicators and the like.

In devices of the prior art undesirable changes in the pressure differential have been produced due to rapid changes in temperature, thereby rendering an inaccurate indication of the true pressure differential.

The problem of rate of change of temperature compensation has been solved to some extent by the use of a metal strip arranged to respond to the rate of temperature change in the manner disclosed in the copending application of Alfred E. Sidwell, Serial No. 216,580, filed June 29, 1938. Another solution of this problem is disclosed in the copending application, Serial No. 322,852, filed March 7, 1940.

One of the objects of the present invention is to provide novel rate of change of temperature compensating means for pressure actuated indicating instruments whereby the error in the indication due to the pressure differential arising from rapid or sudden temperature changes will be counteracted and substantially reduced, if not entirely eliminated.

Another object of the invention is to provide novel compensating means whereby the compensating effect is produced by and in accordance with the rate of temperature change which the instrument undergoes.

A further object of the invention is to provide a novel method of compensation for the rate of change of temperature in pressure actuated instruments by utilizing the difference in deflection between a plurality of similar temperature responsive means which are subjected to different temperatures.

Still another object of the invention is to provide an instrument of the type characterized above in which a novel temperature change responsive means will operate to counteract the indication of the pressure differential arising due to rapid temperature changes which the instrument undergoes.

A still further object is to provide a novel instrument of the pressure responsive type which requires substantially no insulation against changes in temperature.

Still another object of the invention is to provide a novel rate of climb indicator of dependable performance which will be more accurate than prior art instruments under all changes and rates of change in temperature.

Another and still further object of the invention is to provide in a rate of climb indicator subjected to sudden or rapid temperature changes, whereby pressures become unbalanced within the instrument due to such temperature changes and in accordance with the rate of such changes, a novel compensating means comprising a portion exposed to the conditions outside of the instrument and another portion mounted within the instrument whereby the rate of temperature change between the inside and outside of the instrument will effect a direct compensation to counteract the indication due to the temperature change.

A still further object of the invention is to provide a novel rate of climb indicator having a novel compensating means for differential pressures created due to temperature differences between the interior and exterior of the instrument whereby the pressure responsive element within the instrument will be moved bodily in accordance with the time rate of change of temperature to compensate for any deflection due to such differential pressures.

Still another object is to provide in a rate of climb indicator having an instrument casing, novel means responsive to the difference in temperature between the inside and the outside of the casing, whereby errors due to such temperatures difference are eliminated.

The above and further objects and advantages of the invention will appear more fully hereinafter from a consideration of the detailed description which follows, taken together with the accompanying single sheet of drawings wherein one embodiment of the invention is illustrated. It is to be expressly understood, however, that the drawing is for purposes of illustration and description only and is not designed as a definition of the limits of the invention, reference primarily being had for this purpose to the appended claims.

In the drawing, wherein like reference characters refer to like parts in the two views:

Figure 1 is a more or less diagrammatic illustration of one form of pressure responsive instrument having applied thereto the novel compensating means of the invention; and Figure 2 is a side elevation, partly in section, of the operating mechanism and casing of a rate of climb indicator embodying the present invention.

It is well known that the specific gravity of gases, including air, increases with a decreasing temperature and decreases with an increasing temperature so that the velocity of the gas decreases under the former temperature change and increases with a temperature rise.

The principle of the rate of climb instrument depends upon the pressure differential developed in a chamber vented to the atmosphere by a restriction. This pressure differential results from the changing absolute pressure in accordance with the varying altitudes traversed. It will readily appear, therefore, that due to the temperature differentials existing at the interior and exterior of the instrument, additional pressure changes will occur and the instrument will no longer indicate the true rate of climb or descent. The present invention is directed to overcome the undesirable indication due to the pressure differential arising from the differential temperature conditions to which the instrument has been subjected.

For a better understanding of the principles utilized in solving the foregoing difficulty, reference is made to the diagrammatic illustration of Figure 1. There is disclosed a pressure responsive element or diaphragm 10 of any suitable type mounted by means of a boss 11 upon a resilient spring member or base 12 within a container or casing, a portion of the wall of which is shown at 13, having a restricted vent to the atmosphere, as will be more fully described hereinafter. The resilient member or base 12 is securely fastened by any suitable means to the front portion of the casing and is so constructed and arranged as to tend to urge the diaphragm 10 downwardly. Any suitable means such as a screw 14 secured to the front of the casing is provided, whereby an adjustment or zero setting of the mechanism may be effected.

Assuming now, that the interior of the diaphragm 10 is vented directly to the atmosphere exterior of the casing by means of a conduit 15 and that the casing 13 communicates with the atmosphere by way of a restricted vent (not shown in Fig. 1), it will be understood that upon a change of atmospheric pressure due to change of altitude of the craft on which the instrument is carried, the pressure within the diaphragm will equalize immediately with the atmospheric pressure whereas the pressure in the casing 13 will equalize with a lag due to the restriction, thereby causing the diaphragm to expand or contract in accordance with the rate of change of altitude to indicate the rate of climb or descent of the craft.

The instrument will provide proper indication of climb as long as the temperature within the casing and exterior thereto are substantially equal. If, however, the craft carrying the instrument passes into cold surroundings, the temperature outside of the instrument casing will be lower than the temperature at the interior of the casing, whereupon the specific gravity of the gas (air) within the casing will increase due to contraction of the gas, thereby causing a decrease in the pressure of the gas within the casing. This change does not change the pressure of the gas within the diaphragm for the reason that the latter communicates directly with the atmosphere by way of conduit 15 and consequently the pressure within the diaphragm will be at full atmospheric and greater than in the casing. Due to the pressure differential resulting at both sides of the diaphragm and being greater on the inside of the diaphragm, the latter will tend to expand and indicate descent. The converse of the foregoing is likewise true. When the craft has been flying in cold regions and is suddenly subjected to warmer temperatures the specific gravity of the gas within the casing will decrease because of expansion thereby causing an increase in pressure in the casing. The gas within the diaphragm again being at full atmospheric pressure which is less than that in the casing, a differential pressure on both sides of the diaphragm is created tending to cause the latter to contract and to indicate climb.

In order to properly compensate for the error arising from such changes of temperature the rate of change of temperature interior of and exterior to the instrument casing is taken into consideration, the novel compensating means of the invention are provided to substantially reduce, if not entirely eliminate such error. In the form shown, said means comprise two bi-metallic elements 16 and 17, arranged in substantially parallel relationship to each other, provided in such a manner that the Invar portion 16a of element 16 is exposed to the temperature conditions exterior of the casing and the element 17 is subjected to the temperature conditions interior of the casing as shown in Fig. 1. With equal increases or decreases in temperature with in and without the casing, both elements will deflect outwardly or inwardly in the same direction, thereby moving the floating pivot 22 to the right or left without any upward or downward movement thereof, thus producing no upward or downward movement of arm 23.

Each of the bi-metallic elements 16 and 17 is provided with lugs 18 and 19, respectively, adapted to carry two arms 21 and 20 merging at a common point such as the floating pivot 22. An extending lever arm 23 is carried by the arm 20 and contacts the spring base 12 at its free end. The floating pivot 22 will move upwardly or downwardly in accordance with the deflections of the center pieces of the bi-metals and thus bodily move the diaphragm 10 by way of lever arm 23.

When the temperatures within the casing and outside thereof are equal, no indication will result if the craft carrying the instrument stays at a constant altitude. As soon as the surrounding temperature is lowered, however, the pressures within the casing will decrease and cause expansion of the diaphragm. At the same time, since element 16 is exposed to the outside conditions the decreasing temperature will cause a contraction of the brass portion 16b of element 16 to move the element outwardly away from the casing. The distance between lugs 18 and 19 is thereby increased causing a divergent action on the part of arm 20, away from arm 21, carrying lever arm 23 downwardly causing the diaphragm 10 to move downwardly an amount sufficient to compensate for the expansion due to the temperature differential.

The outside gases flow into the casing through a restricted vent and after a small time lag the temperatures within the casing equalize with the temperatures outside of the casing. This equalization brings about equalization of pressures within the casing and the decreased temperature therein will act upon said bi-metal 17 causing the brass portion 17b thereof to contract and deflect the element 17 outwardly in the direction of element 16 to cause arm 21 to converge with respect to arm 20 thereby bringing the lever arm 23 in an upward direction to move the diphragm 10 bodily into its initial or zero position.

The converse of the above results when the gases surrounding the casing are subjected to a greater temperature than those within the casing. In this case the specific gravity of the gases within the casing will decrease thereby causing an increase in pressure within the casing. Since there is direct communication between the diaphragm and the atmosphere surrounding the outside of the casing the pressures within the diaphragm will remain practically constant and the increased pressures within the casing will tend to contract the diaphragm. The brass portion 16b of bi-metal 16 being subjected to the temperature rise, will tend to expand since it has a greater coefficient of expansion than the Invar on the opposite side, moving the element 16 inwardly. The inward deflection on the part of bi-metallic diaphragm 16 raises the pivot point 22 carrying lever arm 23 therewith and raising the diaphragm 10 bodily an amount sufficient to compensate for the contraction due to the differential pressures. As the temperatures within the casing equalize with the temperatures outside of the casing the pressures within the diaphragm and exterior thereto become equalized while the bi-metallic element 17 being now subjected to the increased temperature will deflect in a direction away from the element 16 due to the expansion of its brass portion 17b. The latter deflection acts to move to the point 22 downwardly carrying arm 23 downwardly therewith and also diaphragm 10 back to its initial or zero position.

Referring now to Fig. 2, the foregoing principle is shown applied, in accordance with the present invention, to a rate of climb indicator having its operating mechanism mounted within a suitable casing on a frame of any suitable type and construction, which, as shown, comprises a rear frame member or plate 24 and a face plate 25, said plates being held in spaced relation in any suitable manner as by spacers 26 and screws 27. Mounted in the frame is the pressure responsive element or diaphragm 10 of any suitable type that is adapted to operate in a suitable indicator or pointer when a pressure differential is established between the pressure inside of the element and the pressure surrounding the element within the casing. This may be accomplished, for example, by providing direct communication between the inside of the diaphragm and the atmosphere outside of the instrument casing, while interposing flow retarding diffusing means between said outside atmosphere and the inside of the casing in which the diaphragm is mounted.

The pressure responsive element 10 is mounted in any suitable manner as by means of a boss 11 on a downwardly biased spring base 12 which is secured preferably to the back of the face plate 25 by means such as screws 28. A grommet 11a is provided to secure the boss 11 to the spring base 12 for movement with the latter.

Actuating connections are now provided between the diaphragm 10 and the indicator of the instrument. As shown, for example, in the drawing, such mechanism may constitute a link 29 mounted on the diaphragm for reciprocating action in accordance with the contraction or expansion of the latter. The movement of link 29 may be transferred in any suitable manner through the connecting link 31 to a rock shaft 30 adapted to carry an actuating arm 32. The rock shaft 30 is supported for rotation by means of a supporting member 33 secured to the rear plate 24 by means such as a supporting bracket 33a and as the diaphragm 10 expands and contracts its motion is transmitted to the actuating arm 32 contacting a finger 34. The rock shaft 30 may further be provided with adjusting means such as a screw 30a whereby the actuating linkage may be set to its initial or zero position.

The finger 34 is carried by a spindle 35 journalled in plate 36 which is secured to the face plate 25 by any suitable means such as a screw 37. The spindle 35 is further provided with a counter weighted gear sector 38 adapted to mesh with a pinion 39 splined to a spindle shaft 40 journalled in a bracket 41 at one end and carrying an indicator or pointer 42 at its other end as shown in Fig. 2.

The finger 34 carried by the spindle 35 is engaged by the end of actuating arm 32 for rotation thereby in one direction, and a suitable hair spring 43 tends to rotate the spindle 35 in the opposite direction whereby expansion and contraction of the diaphragm is converted into rotation of the spindle 35 and gear sector 38 in one or the other direction and consequent operation of the indicator 42 through the pinion 39.

The mechanism above described is mounted in an instrument casing 13 being constructed so as to provide a substantially sealed chamber enclosing the diaphragm 10 which communicates with the atmosphere outside the casing through the coupling chamber 44. As shown in Figure 2, the complete mechanism is enclosed within the casing 13. The face plate 25 is seated on a shoulder 45 formed in the casing and held therein by a split ring 46 which engages the underside of a shoulder 47 also formed in the casing. The open end of casing 13 is suitably closed as by means of a split spacing ring 48 and a cover glass 49 held in place by a suitable split ring 50.

The coupling member 44 is provided with a flange or bolt 51 adapted to be securely fastened to the rear portion of the casing 13 by suitable means such as screws 52 and a seal tight fit is effected by way of a sealing gasket 53. The interior of the coupling 44 communicates with the exterior of the casing by means of a threaded passage 54 provided in the rear of the casing adapted to receive a threaded nipple 55 and with the interior of diaphragm 10 by way of conduit 15. Diffusing means, on the other hand, are interposed between the outside atmosphere and the inside of the casing, the latter being of the type disclosed in the issued patent to James E. Bevins, 2,147,962.

Diffusion means of the type described in the above patent, for example, provide means whereby equalization of the pressure inside and outside of the diaphragm may be properly regulated. In the present embodiment, said means may comprise a hollow member 56 suitably connected to coupling member 44 by an air-tight connection. Suitable diffusing elements are provided for closing the ends of the hollow member 56. One of said elements, which is shown as a hollow porcelain tube 57 closed at one end and connected to the hollow member 56 at the other end, closes the right hand hollow member 56 and controls the diffusion of the air between the inside of the instrument casing and the interior of the hollow member 56, while a second similar porcelain member (not shown) is located within the hollow member 56 and controls the diffusion of air between the interior of said hollow member and the outside atmosphere by means of coupling member 44 and passage 54. The hollow member 56 is also provided with an outlet in which is disposed a temperature controlled by-pass valve, the stem 58 of which is controlled in its position by the temperature responsive element 59 adjustably positioned by screw 60. It is to be noted that the element 59 is responsive to the amount of temperature changes and is not actuated in response to the rate of said temperature change. The details of said diffusing means do not constitute a part of the present invention and are fully disclosed in the above-mentioned patent to Bevins to which reference is hereby made for details of the construction thereof.

The novel temperature compensating means of the present invention are now provided, and for this purpose the rear portion of casing 13 is provided with a recess 61 receiving a cylindrical perforated insert 62 which is further provided with a sleeve member 63 being flanged as at 64 so that the latter together with the flanged portion 65 of insert 62 may be rigidly secured to the casing by means such as screws 66.

Arranged within the sleeve member 63 and perpendicularly thereof are two bi-metallic diaphragms or elements 16 and 17 so constructed that the outer side of element 16 exposed to the atmosphere is provided with Invar 16a so that upon an increase in outside temperature the diaphragm will deflect inwardly. The rear portion of element 16 is provided with some other suitable material such as brass, for example, having a greater coefficient of expansion than the Invar at the opposite side. The arrangement of the element or diaphragm 16 in this manner insures a seal tight fit so that no leakage can occur between it and the interior of the casing. It must also be borne in mind that element 16 must be sufficiently rigid so that it will not respond to changing pressures.

The second bi-metallic diaphragm or element 17 is made in the same manner as element 16 but it responds to temperatures within the casing only and deflects outwardly away from the element 16 upon a temperature rise within the casing. Since the coefficient of expansion of the brass portion 17b is greater than the coefficient of expansion of the Invar 17a the brass will tend to expand on temperature rise and will therefore carry the Invar portion with it.

The sleeve member 63 disposed within the insert 62 is provided with perforations 60a and 60b, the formed providing direct communication between the interior of the casing and the Invar portion of element 17 while the latter permits the upward and downward movement of arms 20 and 21 adapted to converge and diverge about a floating pivot 22. The arm 20 carries the lever arm 23 which acts to move the diaphragm 10 by actuating the spring base 12 in accordance with the deflection of elements 16 and 17.

In operation, as has already been described in detail hereinabove in connection with Fig. 1, when the temperature exterior to the casing is greater than within the casing the diaphragm will tend to contract due to the increase in pressure within the casing resulting from the increase in temperature outside of the casing. Since the bi-metallic diaphragm 16 is sensitive to the outside temperature change, the rise in temperature will cause the brass portion of diaphragm 16 to expand and the element 16 will be deflected inwardly toward the casing. The diaphragm 17 remaining relatively stationary, the inward movement of diaphragm 16 will operate to move floating pivot 22 and lever arm 23 upwardly thereby moving spring base 12 with diaphragm 12 bodily an amount sufficient to compensate for the contraction of the diaphragm resulting from the pressure differential created due to the temperature change. As the incoming air passing through the diffusing means reaches the interior of the casing the temperatures will equalize causing equalization of pressures interior of and exterior to the diaphragm while diaphragm 17 being sensitive to the increased temperature will deflect outwardly away from diaphragm 16 carrying pivot point 22 and arm 23 together with diaphragm 10 downwardly an amount sufficient to reestablish the initial position of the diaphragm before the pressure differential had occurred.

On the other hand, when the temperatures outside of the casing are lower than those within the casing the pressure within the casing will drop causing diaphragm 10 to expand. Bi-metallic diaphragm 16 being exposed to the decreased temperature will deflect outwardly away from the casing due to the tendency on the part of the brass portion of the bi-metal to contract. This outward deflection moves lever arm 23 downwardly permitting spring base 12 to carry diaphragm 10 downwardly an amount sufficient to compensate for the expansion resulting from the pressure differential due to temperature change. When the temperatures within the casing equalize with the temperature outside of the casing the pressures within the diaphragm and exterior thereto will equalize while the bi-metallic diaphragm 17 subjected to the temperature change within the casing deflects inwardly causing lever arm 23 to move base 12 and diaphragm 10 back to its initial position prior to the pressure differential arising from the temperature change.

It will now be readily apparent that provision has been made for a desirable and dependable temperature compensator in a rate of climb indicator whereby as the external temperatures change with time there will be a gradual change in the casing temperature with time depending upon the conductivity of the casing. When differential temperatures exist the two bi-metallic diaphragms will be subjected to different deflections, and the difference of deflection will be a measure of the time rate of change of temperature within the casing.

Although only one embodiment of the invention has been illustrated and described, other changes and modifications in form, materials, and relative arrangement of parts, which will appear to those skilled in the art, may be made without departing from the scope of the invention. Reference is now made to the appended claims for a definition of the limits of the invention.

What is claimed is:

1. In a device of the character described, a pressure responsive element subject to a changing atmospheric pressure on one side thereof, means for retarding the rate at which pressure on the other side of said element tends to become equal to said changing atmospheric pressure, and means responsive to a difference in temperature between the two sides of said pressure responsive element for counteracting the operation of said pressure responsive element during sudden temperature changes.

2. In a rate of climb indicator, a sealed casing, a pressure responsive element in said casing being in communication with the atmosphere outside of said casing, a diffuser assembly whereby the casing is in restricted communication with the atmosphere surrounding said casing, and compensating means responsive to temperatures interior of and exterior to said casing for counteracting the operation of said pressure responsive element during sudden temperature changes.

3. In an instrument of the class described, a substantially air-tight casing, a pressure responsive element in said casing in free communication with the atmosphere outside of said casing, means providing restricted communication between said casing and the atmosphere outside thereof, and temperature responsive means adapted to actuate said pressure responsive element as a function of the differential of the temperatures interior of and exterior to said casing.

4. In an instrument of the class described, a substantially air-tight casing, a pressure responsive element in said casing in free communication with the atmosphere outside of said casing, means providing restricted communication between said casing and the atmosphere outside thereof, and means comprising bi-metallic elements responsive to the differential of the temperatures interior of and exterior to said casing for actuating said pressure responsive element.

5. In an instrument of the class described, a substantially air-tight casing, a pressure responsive element in said casing in free communication with the atmosphere outside of said casing, means providing restricted communication between said casing and the atmosphere outside thereof, and means comprising temperature responsive diaphragms, one of which is subjected and is responsive to outside temperatures and the other of which responds to temperatures within said casing, said last-named means being adapted to compensate for the movement of said pressure responsive element due to pressure differentials arising from sudden temperature changes.

6. In a rate of climb indicator, a sealed casing, a pressure responsive element in said casing in free communication with the atmosphere outside of said casing, means providing restricted communication between said casing and the atmosphere outside thereof, a temperature sensitive element responsive to temperatures outside of said casing, a second temperature sensitive element responsive to temperatures within said casing, and means operated by said temperature sensitive elements for actuating said pressure responsive element in accordance with the rate of temperature changes interior of and exterior to said casing.

7. In a rate of climb indicator, a sealed casing, a pressure responsive element in said casing in free communication with the atmosphere outside of said casing, yieldable means mounted in said casing comprising a support for said element, means providing restricted communication between said casing and the atmosphere outside thereof, a temperature sensitive element mounted to respond to temperatures outside of said casing, a second temperature sensitive element responding to temperatures within said casing, and means operated by said temperature responsive means for moving said yieldable means an amount proportional to the differential of the temperatures interior of and exterior to said casing.

8. In a rate of climb indicator, a sealed casing, a pressure responsive element in said casing in free communication with the atmosphere outside of said casing, yieldable means mounted within said casing comprising a support for said pressure responsive element, a diffuser assembly whereby the casing is in restricted communication with the atmosphere surrounding said casing, and means comprising compensating means adapted to move said yieldable means in accordance with the differential of the temperatures interior of and exterior to said casing.

9. In an instrument of the class described, a sealed casing, a pressure responsive element in said casing being in communication with the atmosphere outside of said casing, a diffuser assembly whereby the casing is in restricted communication with the atmosphere surrounding said casing, temperature responsive means comprising a diaphragm mounted in a portion of said casing and responsive to the temperatures surrounding said casing, means responding to temperature changes within said casing, and means operated by said diaphragm and said last-named means for actuating said pressure responsive element in accordance with the rate of temperature change interior of and exterior to said casing.

10. In an instrument of the class described, a sealed casing, a pressure responsive element in said casing in free communication with the atmosphere outside of said casing, a diffuser assembly whereby the casing is in restricted communication with the atmosphere surrounding said casing, temperature responsive means comprising a diaphragm mounted in a portion of said casing and responsive to the temperatures surrounding said casing, a second temperature responsive diaphragm mounted within the casing substantially parallel to said first diaphragm and responsive to temperatures within said casing, and means operated by said daphragms upon a temperature change to displace said pressure responsive element as a function of the differential between the temperature interior of and exterior to said casing.

11. In an instrument of the class described, a sealed casing, a pressure responsive element in said casing in free communication with the atmosphere outside of said casing, said element being responsive to differential pressures resulting from changes in temperature interior of and exterior to said casing, means providing restricted communication between said casing and the atmosphere surrounding said casing, means carried by said casing adapted to respond to temperature variation outside of said casing to thereby move said pressure responsive element in opposition to the movement produced by the pressure differential due to temperature change, and means mounted within said casing for moving said element to its initial position when the temperatures within said casing have equalized with the temperature outside of said casing.

12. In an instrument of the class described, a substantially air-tight casing, a pressure responsive element within said casing in free communication with the atmosphere outside of said casing, said element being responsive to differential pressures produced by changes of temperature interior of and exterior to said casing, means providing restricted communication between said casing and the atmosphere surrounding said casing, means comprising a bi-metallic diaphragm carried by a portion of said casing and adapted to respond to temperature variation outside of said casing, means actuated by said diaphragm adapted to move said pressure responsive element in opposition to the movement produced by the pressure differential due to temperature change, and means comprising a second bi-metallic diaphragm mounted within the interior of said casing for moving said pressure responsive element to its initial position when the temperatures within said casing have equalized with the temperature outside of said casing.

13. In a pressure responsive indicating instrument, a casing, a pressure responsive element in said casing, indicating means actuated by said pressure responsive element upon expansion and contraction thereof due to changes in pressure, said element being subject to differential pressures produced by sudden changes in temperature between the inside and outside of said casing, whereby said indicating means tend to give an erroneous indication of a change in the desired pressure to be indicated, and means responsive to a difference in the temperature between the inside and outside of said casing for counteracting the effect of said temperature difference on said pressure responsive element, whereby the error of said indicating means is substantially reduced.

14. In a pressure responsive indicating instrument, a casing, a pressure responsive element in said casing, indicating means actuated by said pressure responsive element upon expansion and contraction thereof due to changes in pressure, said element being subject to differential pressures produced by sudden changes in temperature between the inside and outside of said casing, whereby said indicating means tend to give an erroneous indication of a change in the desired pressure to be indicated, means responsive to changes in temperature inside of said casing, means responsive to changes in temperature outside of said casing, and means actuated by said temperature responsive means when a difference in temperature exists between the inside and outside of said casing for counteracting the effect of said temperature difference on said pressure responsive element, whereby the error of said indicating means is substantially reduced.

CHRISTOPHER A. RAFFERTY.